UNITED STATES PATENT OFFICE.

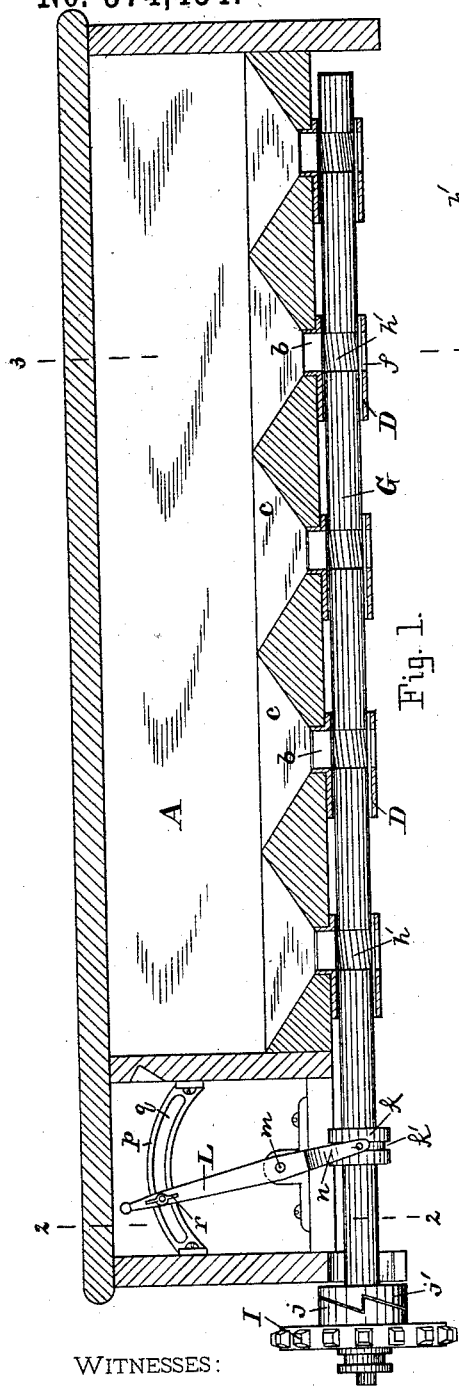

THOMAS R. CRANE, OF HEATHSVILLE, VIRGINIA.

FEED DEVICE FOR GRAIN-DRILLS.

SPECIFICATION forming part of Letters Patent No. 374,454, dated December 6, 1887.

Application filed July 11, 1887. Serial No. 243,923. (No model.)

*To all whom it may concern:*

Be it known that I, THOMAS R. CRANE, a citizen of the United States, residing at Heathsville, in the county of Northumberland and State of Virginia, have invented certain new and useful Improvements in Feed Devices for Grain-Drills, of which the following is a specification.

My invention relates to an improved feed device for grain or seed.

The object of the invention is to provide a new feed device which may have its adjustment easily changed so as to pass or discharge any desired quantity of grain or seed, and which will pass the quantity for which it may be set with regularity, and admit of being readily cleaned in the event of becoming choked up.

Referring to the accompanying drawings, which illustrate the invention, Figure 1 is a longitudinal vertical section of a grain or seed hopper, such as is usually mounted on drills, provided with my feed. Fig. 2 is a cross-section of the hopper on the line 2 2. Fig. 3 is a cross-section of the hopper on the line 3 3. Figs. 4 and 5 show cross-sections of the feed-shaft, and illustrate variations in the size of the feed-serrations. Fig. 6 is a longitudinal view of the feed-shaft, showing serrations. Fig. 7 shows the feed-shaft provided with round grain-recesses. Fig. 8 is a top view of one of the tubular sections.

The hopper A has openings in its bottom, each of which is occupied by the flanged mouth $b$ of the feed device. The bottom of the hopper may be of any shape, but preferably is funnel-shaped, as at $c$, around each opening. A tubular section, D, (see Figs. 1, 3, and 8,) which comprises a part of the feed device, is secured to the hopper below each opening. Each tubular section comprises a short length of tube open at both ends and having at the top side a mouth, $b$, provided with a flange around it. This flange fits up in the said opening of the hopper-bottom. The tubular section has at the bottom a discharge-feed opening, $f$, and also has four lateral flanges, $e$, each provided with a bolt-hole, $e'$, by which bolts $e^2$ secure the said tubular section to the hopper. A shaft, G, below the hopper, extends through all of the tubular sections and occupies each one. This shaft has, at intervals along its length, zones of grain-depressions, which may be round recesses $h$ or serrations $h'$. One zone is located at each tubular section. The serrations $h$ extend, preferably, diagonally with respect to the length of the feed-shaft; but they may be parallel with the axis of said shaft. I deem the diagonal position, however, of advantage.

The feed-shaft has at one end mechanism for turning it. Any suitable mechanism may be used for this purpose. In the present instance a sprocket-wheel, I, and a simple clutch device, $j\ j'$, are employed, same as shown in my patent dated May 24, 1887, No. 363,604. It will be understood the feed-shaft revolves, and may also be moved endwise, as hereinafter described.

The feed-shaft has a collar, $k$, with a peripheral groove, $k'$, and a lever, L, has a pivot, $m$, by which it is mounted in the end of the hopper. The lower end of the lever has two prongs, $n$, which straddle the collar $k$ on the shaft, and each prong has an inward lug, $o$, and both lugs take into the peripheral groove $k'$. It will be seen that the lever L serves to adjust the shaft G endwise, and thereby increases or diminishes the extent of the serrations $h'$, which are to be exposed at the flanged mouth $b$, and of course thus regulate the feed. A bar, $p$, is secured in the end of the hopper above the lever-pivot, and has a slot, $q$, and the lever L moves along the side of the bar and carries a set-screw, $r$, which also occupies the slot $q$ in the said bar. It will be seen that the lever L may be moved to any desired position for the purpose of changing the feed—*i. e.*, increasing or diminishing the discharging quantity of seed or grain—and the lever may be retained wherever placed by the set-screw.

When the feed-shaft G is in position for operating, the smooth part of the shaft, each side of the grain-depressions $h\ h'$, snugly fits in the tubular sections D; but as the grain-depressions are not so prominent as the full size of the shaft, they will not bear against the interior of the tubular sections. In the event of the grain-depressions in the feed-shaft becoming clogged or choked, it is only necessary to move the shaft endwise far enough to expose them outside of the tubular sections D. Thus the entire withdrawal of the feed-shaft may often be avoided.

In Letters Patent No. 363,604, granted to me May 24, 1887, the tube extends the entire length of the hopper-bottom, said tube having within it a feed-shaft which extends the entire length thereof, and I do not claim such construction of tube and shaft in my present invention.

Having described my invention, I claim and desire to secure by Letters Patent of the United States—

1. In a feeding device, the combination of the hopper provided with openings in its bottom, the open-ended tubular sections D, secured at intervals to the hopper-bottom below each opening, and having an upward flanged mouth, b, and a discharge-opening, and a revolving endwise-movable feed-shaft, G, having grain-depressions, said shaft being connected to all of the tubular sections, as shown and described.

2. In a feeding device, the combination of a hopper having openings in its bottom provided with open-ended tubes having upward flanged mouths b and discharge-openings, a feed-shaft having grain-depressions, said shaft connected on each side of the tubes and forming therewith a continuous body portion along the bottom of the hopper, and the feed-shaft also provided with a collar, and a lever, L, connected, substantially as described, with said collar, whereby said shaft is adapted to have endwise movement from the tubes to expose the depressions, as and for the purpose set forth.

In testimony whereof I affix my signature in the presence of two witnesses.

THOMAS R. CRANE.

Witnesses:
JOHN E. MORRIS,
JNO. T. MADDOX.